Dec. 12, 1950 — I. A. WEAVER — 2,533,980
LIFTING AND LOWERING APPLIANCE
Filed Jan. 4, 1946 — 7 Sheets-Sheet 1
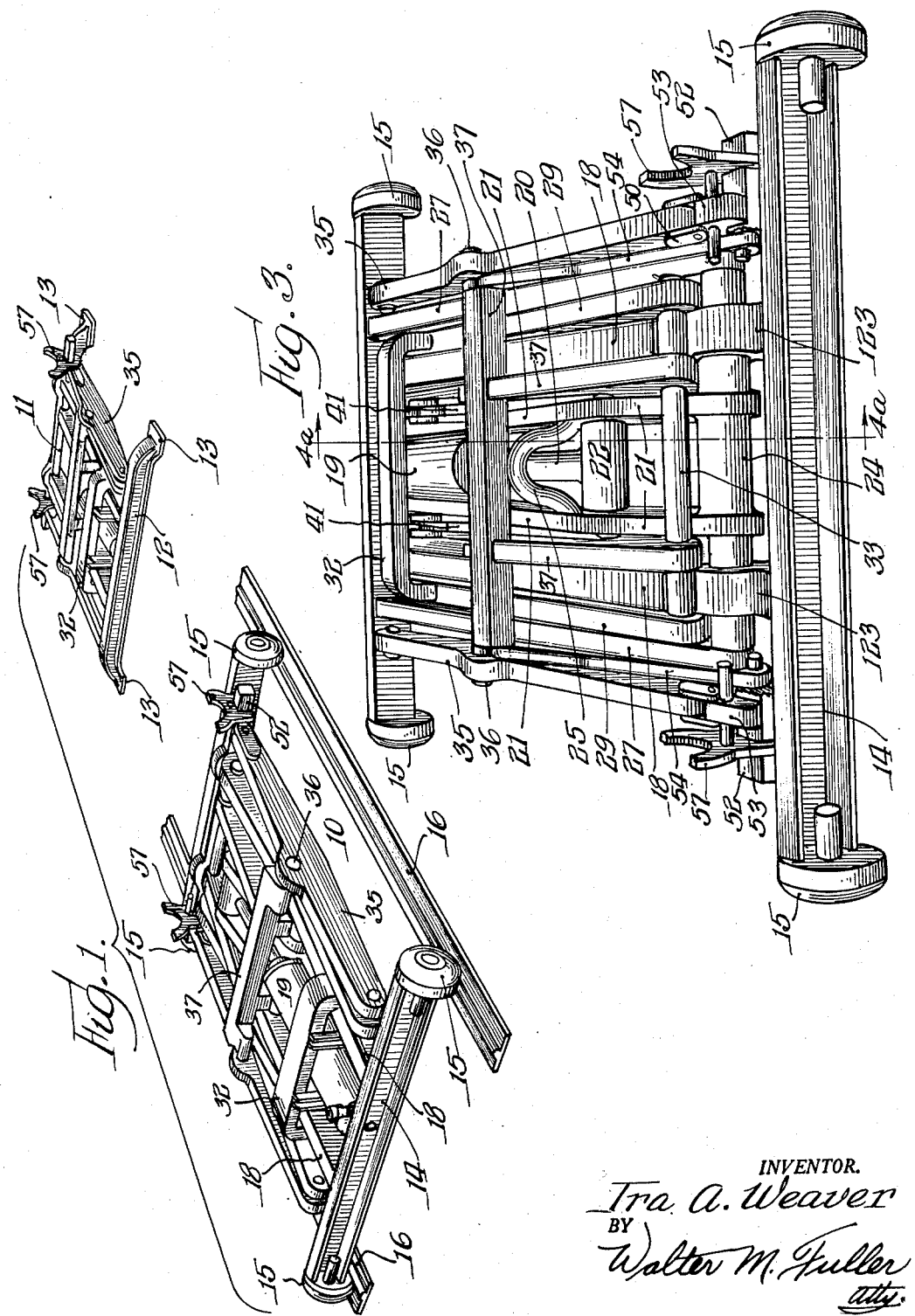
INVENTOR.
Ira A. Weaver
BY Walter M. Fuller
atty.

Dec. 12, 1950  I. A. WEAVER  2,533,980
LIFTING AND LOWERING APPLIANCE
Filed Jan. 4, 1946  7 Sheets-Sheet 2
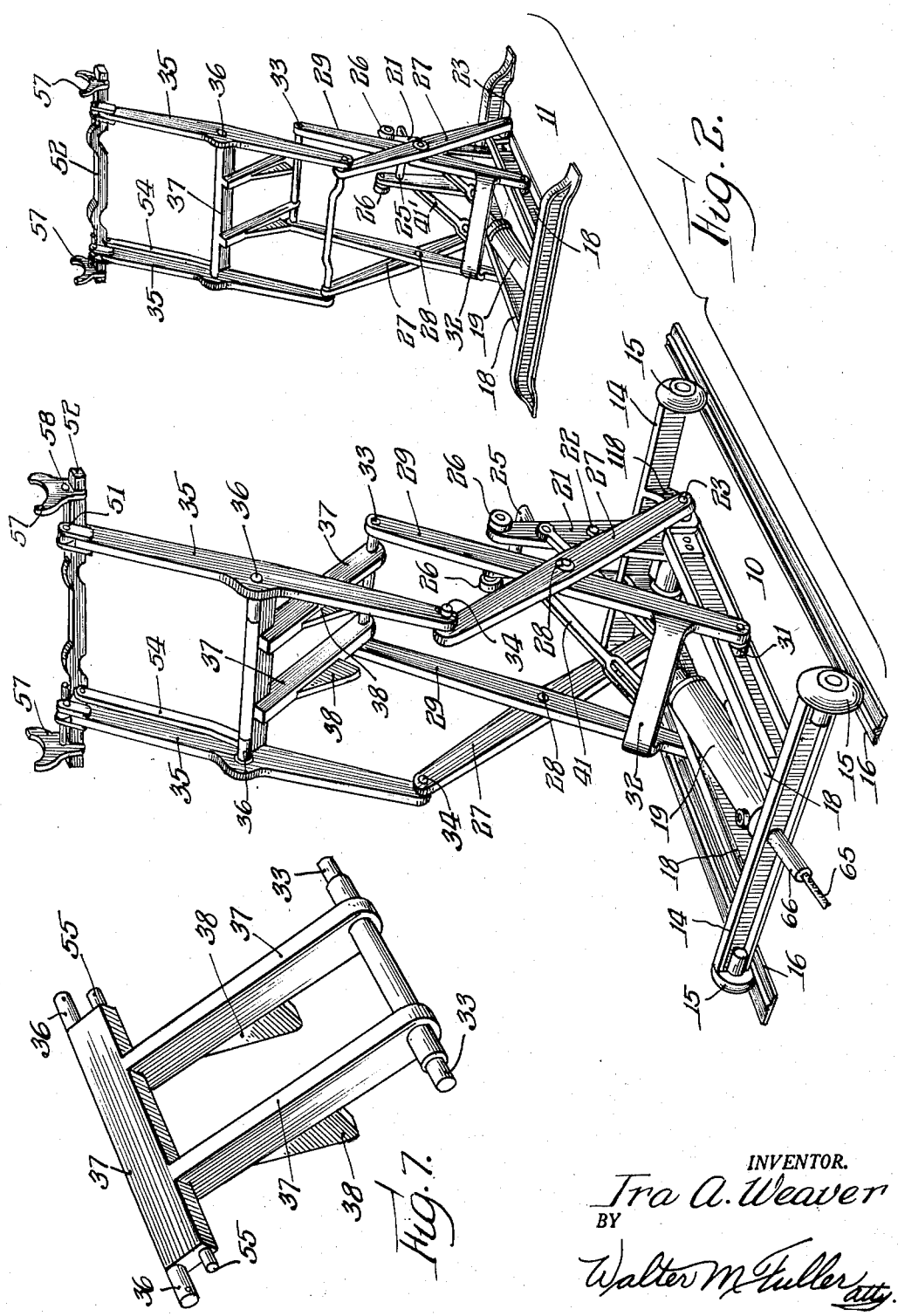
INVENTOR.
Ira A. Weaver
BY
Walter M. Fuller atty.

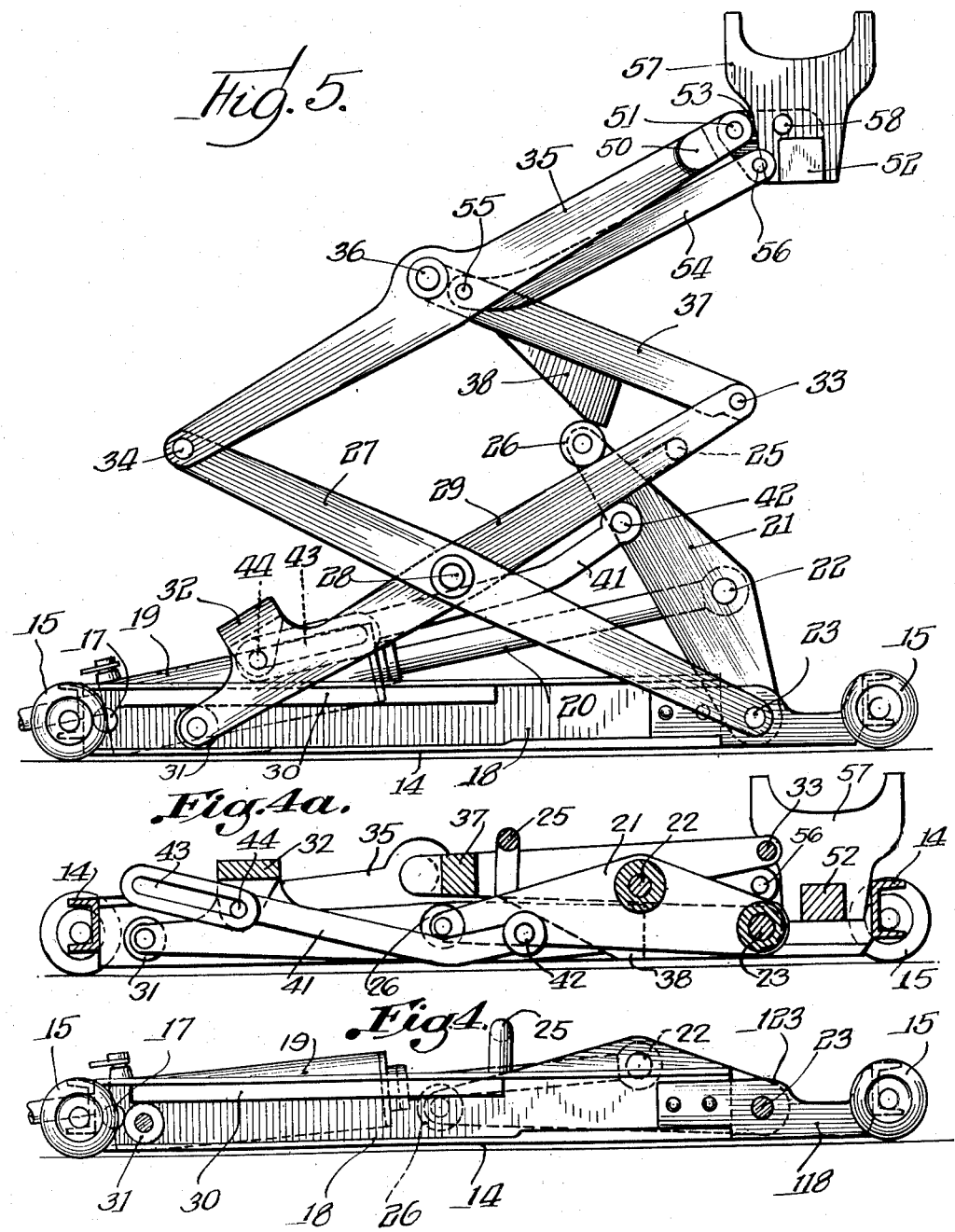

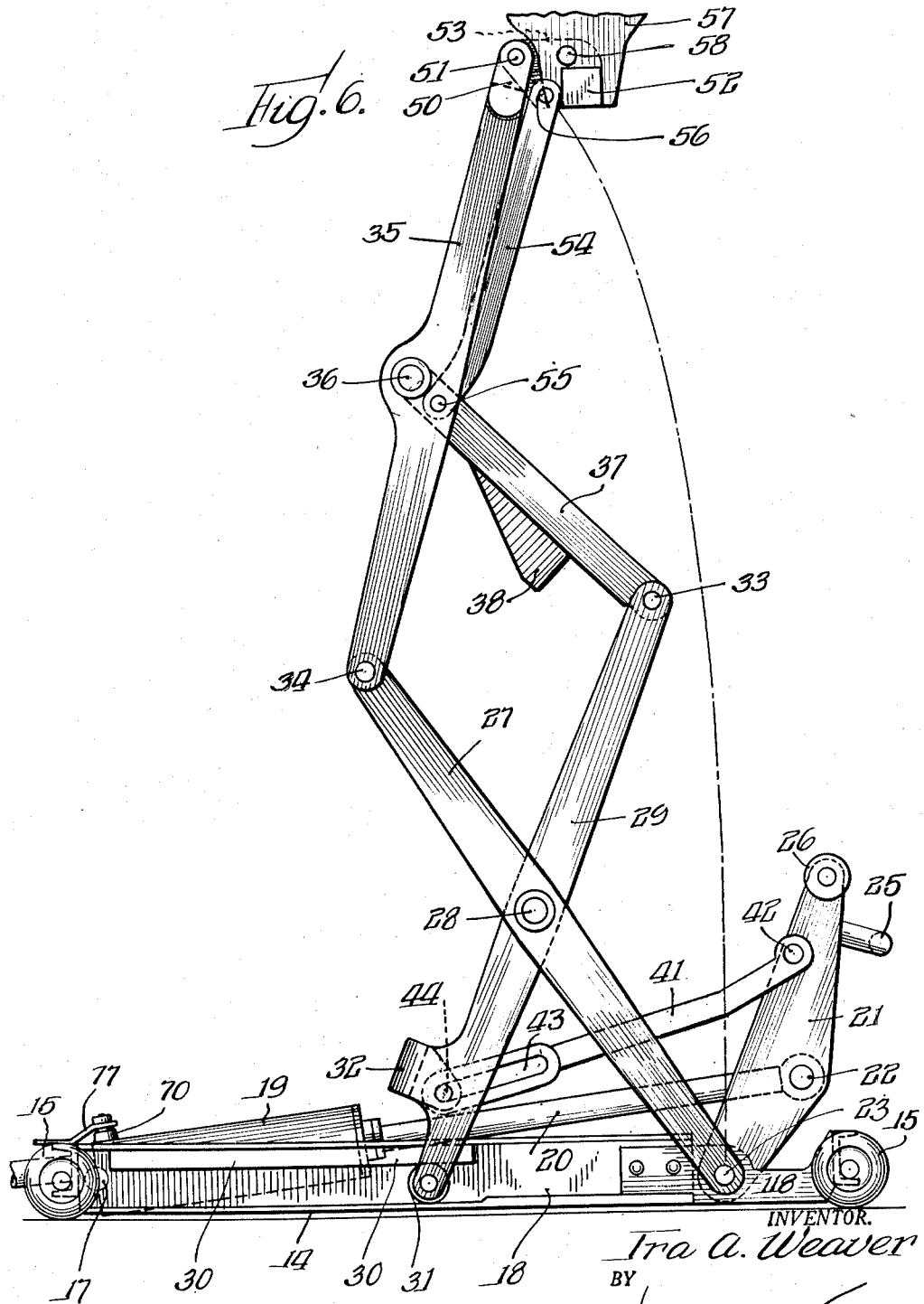

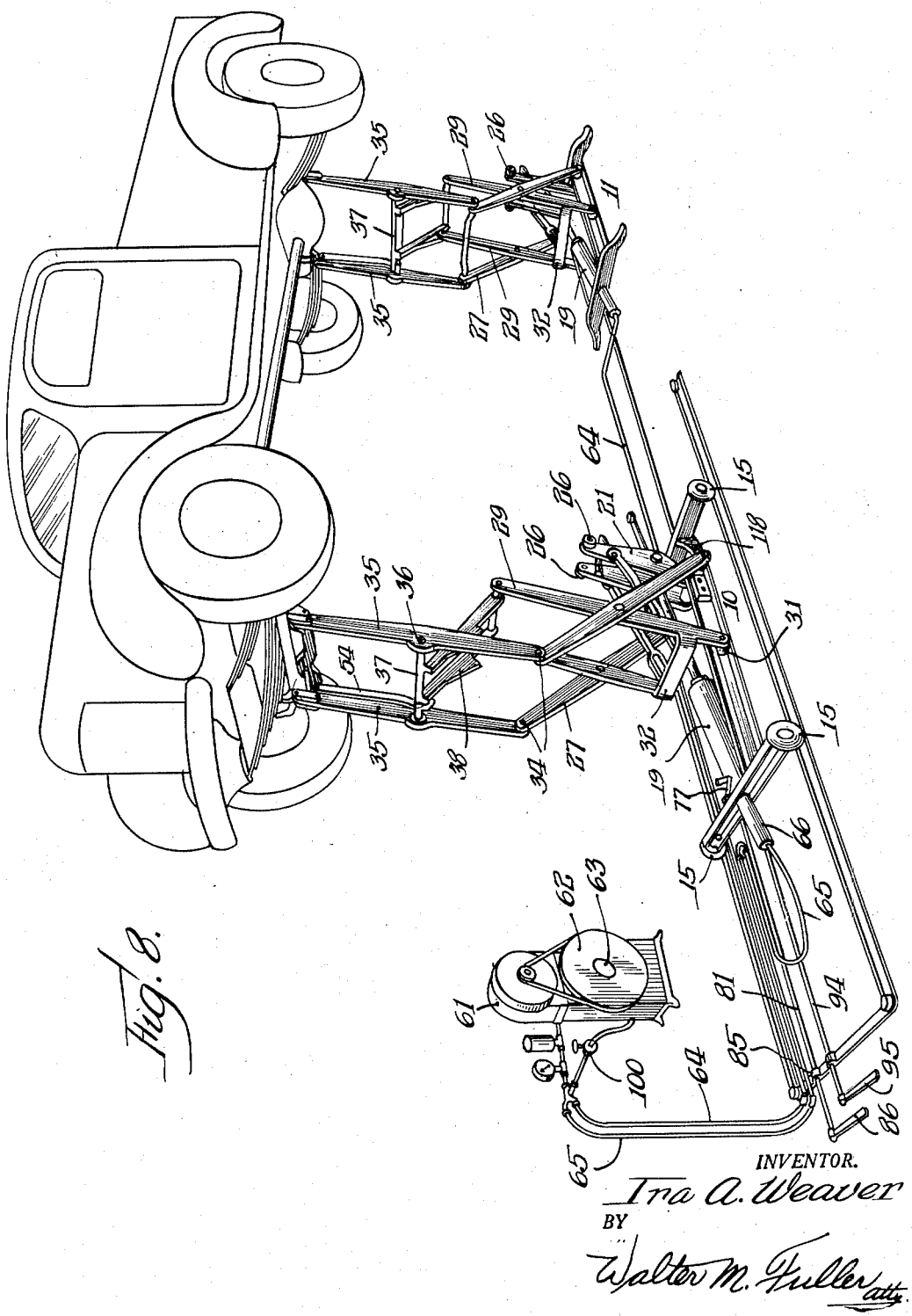

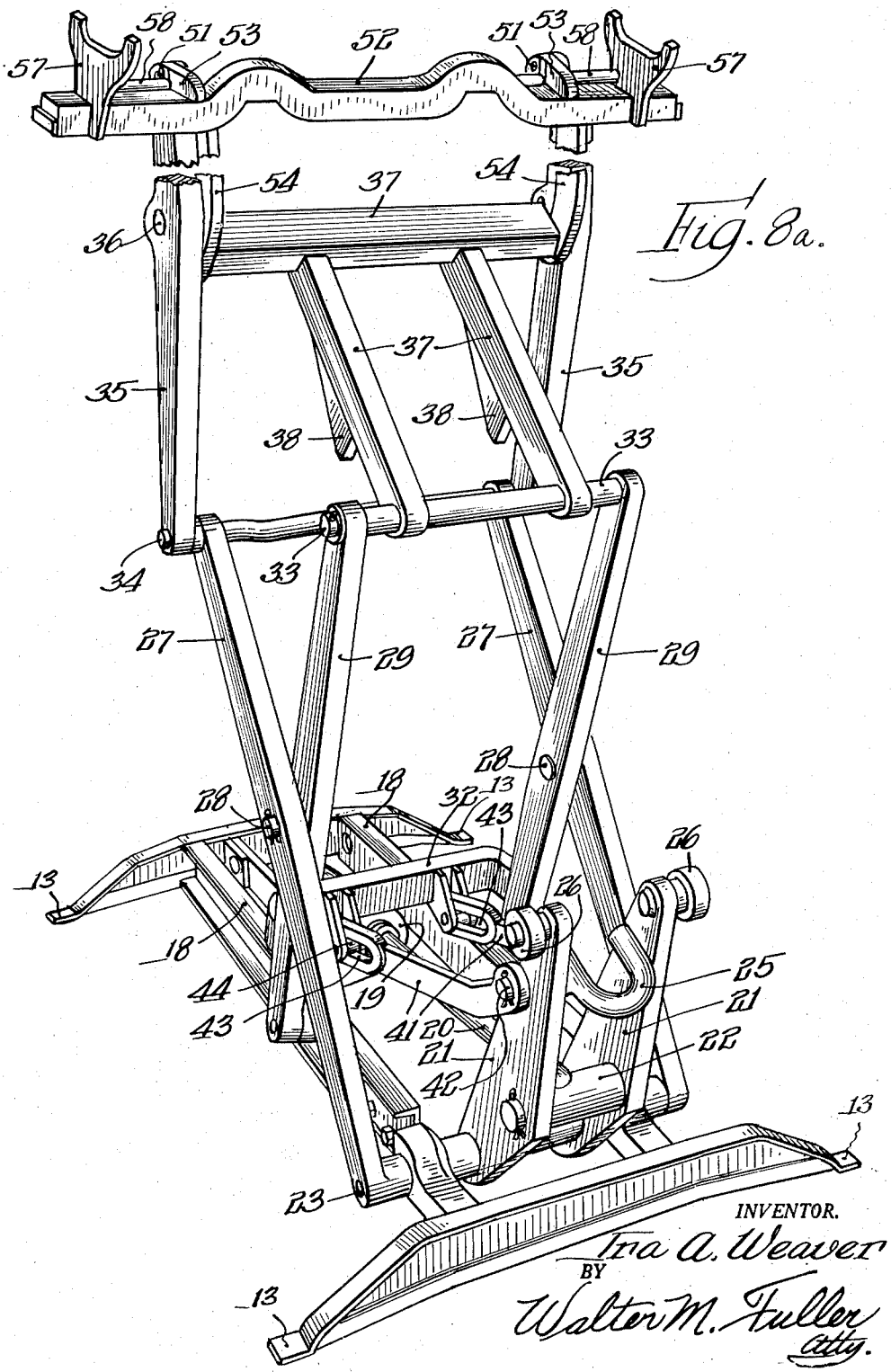

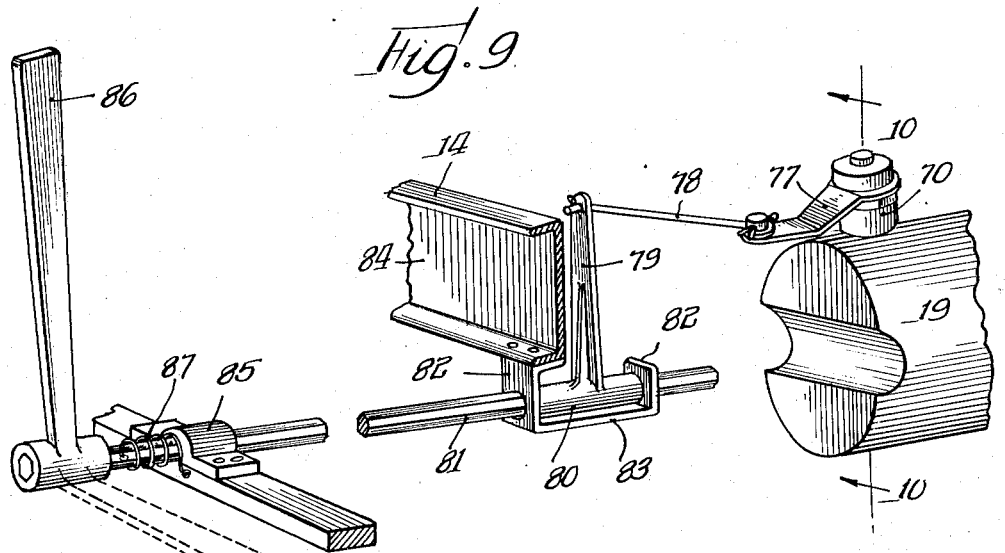
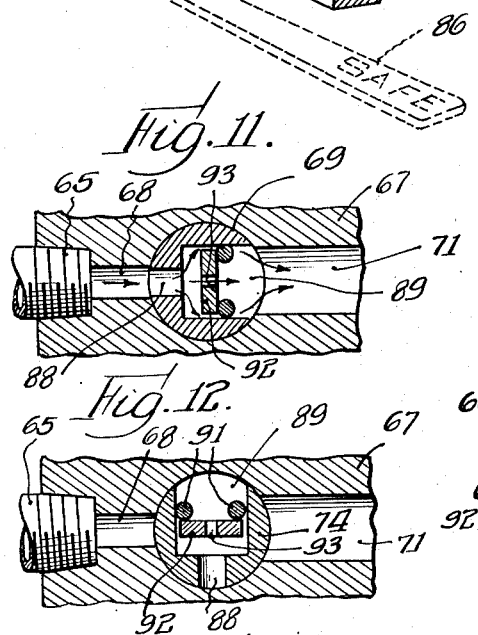
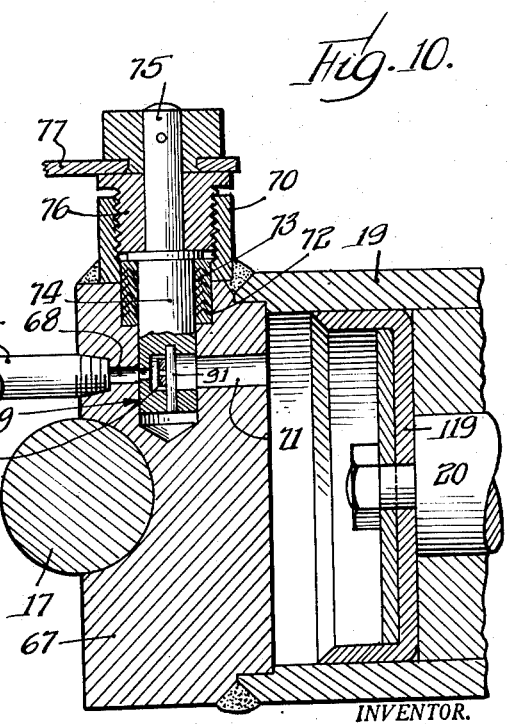
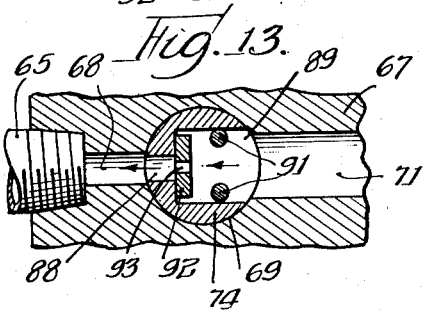

Patented Dec. 12, 1950

2,533,980

UNITED STATES PATENT OFFICE 2,533,980

LIFTING AND LOWERING APPLIANCE

Ira A. Weaver, Springfield, Ill., assignor to Weaver Engineering Co., a corporation of Illinois Application January 4, 1946, Serial No. 639,072

3 Claims. (Cl. 254—89)

This invention relates to certain novel features of benefit and advantage in the structural characteristics and functional properties of load lifting-and-lowering appliances and it concerns more particularly, but not necessarily exclusively, vehicle elevating-and-descending constructions of the general type employing a pair of front and rear, power-actuated, folding mechanisms which rest entirely on the floor or ground and are adapted and designed to cooperate with the corresponding portions of the vehicle, one of the objects of the invention being to supply a lift which may be supported wholly on the floor with no part of the device below floor level.

Another purpose of the invention is to provide a lift which descends to a low level, offering but slight obstruction when not in use.

A further intent of the invention is to furnish an apparatus of this character which consists of two substantially-identical lifting-mechanisms, one for each axle of a vehicle, providing maximum accessibility to the underparts of the elevated car for inspection, repairs, etc.

An added design of the invention is to attain a satisfactory degree of portability of the appliance, since the apparatus incorporating the invention may be readily moved from one spot to another in a few minutes.

A supplemental purpose of the invention is to make the device adaptable to automobiles of varying wheel-base lengths by convenient means of adjustment of one of the lifting units.

An additional aim of the invention is to provide a lifting mechanism on which the elevated vehicle is not confined to a horizontal position and wherein either the front or rear end thereof may be maintained at a lower level than the opposite end, this being a particularly novel and useful feature.

Another object of the invention is to afford a maximum degree of safety against overturning, this being accomplished by a novel method of causing the elevating saddles engaging the vehicle to move automatically to a point more midway between the supporting points which rest on the floor.

A further predetermination of the invention is to make available improved and novel means to assure that by no chance can the raised vehicle descend unduly rapidly, this safety feature being of material importance.

A present preferred embodiment of the invention in a satisfactory vehicle-lift accomplishing the above-stated and other intents and designs of the invention has been illustrated in the accompanying drawings forming a part of this specification and to which reference should be had in connection with the following detailed description, like elements or parts of the mechanism in the several views of these drawings, for the sake of simplicity, having been supplied with the same reference numerals.

In these drawings—

Figure 1 shows the novel, duplex lifting-appliance in perspective in collapsed or lowered condition;

Figure 2 depicts the same dual mechanism in perspective in fully raised or expanded condition;

Figure 3 presents the movable one of the two parts of the appliance in perspective in fully lowered relation but as viewed from the opposite end than that shown in Figure 1 and with the saddle-bar partially broken away;

Figure 4 shows the same unit of the double structure in its lowermost position in side view with the linkages and load-saddles removed;

Figure 4a is an upright longitudinal section of the appliance shown in Figure 3 on line 4a—4a of Figure 3;

Figure 5 illustrates the same member of the double construction complete with its linkages and saddles in partly raised relation;

Figure 6 is the same mechanism in fully elevated condition;

Figure 7 portrays the compound cam-link in perspective;

Figure 8 pictures the duplex appliance maintaining a vehicle in lifted position, and it shows the hydraulic-controlled mechanism of the apparatus with some parts omitted;

Figure 8a is a perspective view of the rear stationary lifting-and-lowering appliance characterized 11 in Figure 1;

Figure 9 shows the hydraulic governing means for the longitudinal adjustable lift;

Figure 10 is an enlarged section on line 10—10 of Figure 9 through the head end portion of the hydraulic-cylinder and its governing valve; and Figures 11, 12 and 13 are horizontal sections through the valve on the line shown in Figure 10 with the valve in different operative positions.

As will be readily perceived from Figures 1, 2 and 8 of the drawings, the innovatory appliance consists of two, longitudinally spaced-apart, lifting-and-lowering mechanisms 10 and 11 largely identical in structure and in mode of operation, except that the rear one 11 has its base-frame 12 of somewhat different shape, whose four lateral feet 13, 13 (Fig. 1) are securely fastened to the floor in any approved means, such as by screws, whereas the base-frame 14 of the other or front unit 10 (Fig. 1) is fitted with four carrying-wheels 15, 15 adapted to travel on a pair of parallel rails 16, 16 or on the floor.

Since the elevating and lowering mechanisms of both lifting-units are practically alike, only one need be described.

Horizontally hinged at 17, Figures 4, 4a, 5 and 6, to the frame 14, of the front unit 10, between the parallel, longitudinal, members 18, 18 of such frame 14 is a central, vertically rockable, inclined hydraulic-cylinder 19 whose plunger-rod 20 (Figures 5 and 6) is pivotally attached at its external end to a duplex-arm 21 at an intermediate point of the length of the latter at 22 and between the two parallel parts of such double-arm (see also Fig. 3).

This double lever or arm 21 (Fig. 3) is rigid with the central part 24 of shaft 23 oscillatory in bearings 123, 123 forming parts of the reduced extensions 118, 118 of the frame-elements 18, 18, this lever consisting of a pair of parallel members fixedly united together by, and rockable together with, shaft 23 and also fixedly joined together by an inverted U-shape yoke 25 (Figures 3 and 4) of that form and shape to accommodate the piston-rod 20 between its arms in some low positions of the latter.

It should be evident that, as piston-rod 20 slides outwardly from its cylinder 19 (Fig. 5), due to hydraulic-pressure within the cylinder acting on its piston 119 (Figure 10), this double lever-arm 21 is rocked or rotated upwardly around the axis of part 23, the opposite ends of the two equidistant or like parts of such lever carrying a pair of rollers 26, 26 (Figures 2, 4, 5, 6 and 8).

Two equal-length links or arms 27, 27 are hinged on the opposite end portions of the fixed axis shaft 23 outside of frame extensions 118 (Figures 2, 3, 5 and 6) and each such arm 27, at an intermediate point 28 of its length, is hinged to, and near the center of, a companion arm or link 29 of the same length as, and located inwardly of, arm 27, but still outside of base frame 18, such arm or link 29 being supplied at its lower end with a carrying roller 31 adapted to roll or travel back and forth horizontally between the lower flange of channel-bar 18 of the corresponding frame-element and beneath a parallel guide-bar 30 on the frame (Fig. 5).

Near their lower ends the pair of companion bars 29, 29 are rigidly connected together crosswise by a yoke or cross-bar 32 (Figs. 2, 3, 5, 6 and 8) and at their upper ends they are joined together by a shaft or rod 33 constituting an integral part of a rigid cam-casting designated as a whole 37 and shown in Figure 7.

At their top ends the duplicate arms 27, 27, by shafts or rods 34, 34, are hinged to the lower ends of another pair of twin arms or links 35, 35 which at intermediate points 36, 36, above their center lines, are rockingly connected to the cam-link frame 37 whose two, parallel, spaced-apart arms or links are rockingly connected at 33, 33 to the top ends of links 29, 29, the underside cam-portions of such arms being designated 38, 38.

A separate bent link 41 (Figures 2, 3, 4, 5 and 6) is hinged at 42 to each of the two arms of the duplex lever 21, 21, the opposite end of each such link 41 having a longitudinal slot 43 accommodating a pin 44 mounted in apertures in a pair of spaced-apart ears 132, 132 fixed to and projecting inwardly from the cross-bar 32 connecting together the two links or arms 29, 29 on an inner portion of the connecting member 32 joining the two arms 29, 29 together.

The upper end of each link or bar 35 has hinged thereon at 51 between a pair of extensions 50 a portion of a single, transverse saddle-bar 52 rectangular in cross-section, by means of a lateral projection 53 of the bar, and, in order that the top surface of such bar may be maintained horizontal crosswise and the bar not rocked laterally while ascending or descending, a pair of links 54 are rockingly connected at their opposite ends to the cam-link 37 on the integral opposite studs 55, 55 and to the saddle-bar projections 53, 53 at 56.

On each protruding end of the saddle-bar 52 is slidingly-mounted an appropriately-shaped saddle 57 having in its underpart a rectangular, open-bottom space closely fitting over the top and sides of the saddle-bar and to hold each saddle always in upright position its has an inwardly-extended, round rod 58 rigid therewith and slidably fitting in an aperture through the corresponding saddle-bar projection 53 whereby the two companion saddles 57, 57 may be readily manually adjusted toward and from one another to conform to the portion of the vehicle they are to engage and to support.

The length of each rock-arm 27 between its hinge-connections 23 and 28, the length of each arm 29 between its pivotal-connections 28 and 33, and the length of the cam-link 37 between the axes of its parts 33 and 36 are equal.

The length of each arm 29 between the axis of its roller 31 and the point 28, the length of each arm 27 between the axis of its pivotal points 28 and 34, and the length of each arm 35 between the points 34 and 36 are all equal, but they are slightly longer than the equal lengths set forth in the immediately preceding sentence, this construction having a distinct advantage as will be understood from the following description of the operation of the appliance.

When the apparatus is to be raised or unfolded to elevate its load by the pair of saddles, oil, or other liquid, is forced under pressure into cylinder 19 thereby moving its piston-rod 20 outwardly and causing the duplex lever-arm 21 to rotate about its fulcrum axis 23 during which action the pair of rollers 26, 26 on such arm engage and travel outwardly longitudinally on the undersurfaces of the cam-portions 38, 38 of the rigid dual link-member 37 causing the linkages to start to unfold and rise, this action being transmitted through the various links, pivots and levers of the entire mechanism resulting in its partially unfolding.

In this connection it is to be noted that as shown in Figure 4 in the completely collapsed condition of the mechanism the pivotal point 22 is at a higher level than the two axes 17 and 23 so that the piston-rod 20 has an initial advantageous leverage on the part 21.

By the time the pair of rollers 26, 26 reach the ends of their companion cams 38, 38 the rocking of arm 21 will have caused the ends of the slots 43, 43 of the two links 41, 41 to engage their pins 44, 44 (Figure 5) on the double cross-connected arms 29, 29 so that the continued further rocking of arm 21 to its limit of movement causes the complete unfoldment of the mechanisms by such action on the arms 29, 29, their rollers 31, 31 traveling inwardly horizontally because of their guides 18, 30 (Figure 6).

By reason of the off-center location of the pivotal connections 28 and 36, the saddle-bar 52 and its complementary saddles 57, 57 do not ascend vertically but take the curved path depicted by the dot-and-dash line presented in Figure 6, which action is of marked advantage because they transport the load inwardly somewhat of the lower supporting frame and hence render the load more stably sustained and more evenly distributed on the base. Obviously, when lowered the saddles descend in the same curved manner.

Turning now to the novel and improved means for applying and controlling the hydraulic-pressure for the operation of the lifting-and-lowering means this is illustrated in detail in Figures 8 to 13 inclusive.

An electric-motor 61, by a belt-and-pulley drive 62, operates an oil-pump 63 to supply oil under suitable pressure to a pair of conduits 64 and 65, the former of which leads to the cylinder of the stationary, rear lift, the conduit 65 being flexible, at least in part, and leading into the cylinder 19 of the front adjustable lift through a protector 66 and an aperture through the end-wall of the longitudinally-shiftable base.

As is depicted in Figure 10, one end-wall 67 of the longitudinally-adjustable hydraulic-cylinder 19 fits partially in, and is securely welded to, the cylinder in order to provide a thoroughly safe and reliable unit.

Conduit 65 delivers its oil under appropriate pressure through such cylinder end or head, such passage including a small-diameter portion 68 communicating with an upright, cylindrical valve-chamber 69 which in turn connects with a larger-diameter cylindrical portion 71 leading into the interior of the cylinder, the two portions 68 and 71 being coaxial.

On its top, the cylinder 19 has an internally, screw-threaded boss 70 welded thereon in register with the valve-chamber 69, the latter at its upper end communicating with a cylindrical, enlarged space 72 partially in the cylinder-head and partly in the boss and accommodating a suitable gasket 73 between the wall of such chamber and a cylindrical-valve 74, the lower portion of which occupies the valve-chamber 69, the upwardly extended stem 75 of the valve fitting through and in a hollow bearing 76 screwed in the boss, the protruding end of the valve-stem 75 having a lateral, operating arm 77 fixedly mounted thereon in any approved manner.

Inasmuch as the cylinder of the adjustable lifting-mechanism is movable backward and forward suitable provision must be provided for compensation for such travel, although this is not necessary for the rear stationary lift.

Accordingly, valve-arm 77 (Figure 9) is operatively connected by a link 78 to the upper end of an arm 79 equipped at its lower end with an integral sleeve 80 having an internal, longitudinal, hexagonal hole therethrough accommodating a hexagonal rod 81 on which such sleeve is lengthwise slidable, the sleeve, at its opposite ends, contacting with spaced-apart end-walls 82, 82 of a bracket 83 fixedly mounted on the underside of, and, therefore, movable with, the end-wall 84 of the base-frame 14.

Rod 81 is mounted, in any approved manner, for manual oscillation in a stationary bearing 85, the apertures in walls 82, 82 being round to allow such rocking of the rod, and the front end of the rod has a handle 86 fixed thereon by means of which the rod may be swung from its normal, horizontal, floor-engaging, valve-closed position, as shown in dotted lines in Figure 9, in which it displays "Safe" on its top face, to the upright, valve-open position shown and in which it must be held by hand, because the handle automatically returns to floor-position as soon as released, intentionally or accidentally, by the operator, due to the action of a coiled-spring 87 connected at one end to the bearing 85 and at its other end to the rod 81.

Now, as to the detailed structure of valve 74, on a level with the aligned passages 68 and 71 (Figures 10 to 13) the valve has a crosswise passage through it composed of a small-diameter round hole 88 connecting axially internally with a larger-diameter section 89, the latter having a pair of parallel, spaced-apart pins 91, 91 mounted fixedly in the valve body and extending vertically through such chamber 89.

Located between this pair of companion retaining pins 91, 91 and a flat, round wall-surface at the inner end of opening 88 is a thin, loose, circular disc 92 slightly less in external diameter than the caliber of chamber 89 which accommodates it and having a small, central, metered opening 93 through it.

From what precedes, it will be clear that when the valve occupies the angular relation shown in Figures 10 and 11, by reason of the operator holding the handle 86 in its upright position, the oil under pressure entering the chamber 89 through the connected passages 65, 68 and 88 forces the disc over against the two retaining-pins 91, 91 and maintains it there allowing the oil relatively free flow through the valve into the cylinder around the outside of the disc and also through its metered-hole 93 and, in this way, the oil is fed into the cylinder without substantial restriction causing the ascent of the lifting mechanism.

When the load has reached its proper height the operator releases handle 86 which immediately swings down to the floor position thus turning the valve 90 degrees into the position portrayed in Figure 12, thus completely closing the passage through the cylinder-head into the cylinder and retaining the parts of the appliance in their expanded and elevated relation.

When it is desired to collapse the expanded mechanism to lower the load, the pump having been stopped and valve 100 having been opened to permit flow of oil into the oil-reservoir in the base of the pump, the oil in conduit 65 is permitted to return to such oil-reservoir so that the oil in the cylinder 19 may be discharged through its valve by gravity and due to the weight of the associated parts, the operator lifts the handle 86 into vertical position again and holds it there, but the oil in flowing out through valve 74 then pushes the metered-disc 92 against the inner end-wall of chamber 89 so that the metered-aperture portion of the disc covers the mouth of passage 88 thus effectively restricting the flow of the discharging oil to assure that the descent of the load will be at the rate desired and will, under no circumstances, be excessive even if any part of the oil-system outside of the cylinder-head should break or become faulty in any way.

This is a valuable feature since the possibility of dropping of the load must be certain of non-occurrence because of the great danger involved therein and in this connection it is to be noted that valve 74 is never opened for any purpose except under the direct intention and action of the operator, and if anything happens to him, the valve closes, its lever or handle 86 automatically assuming the safe position.

The cylinder for the stationary unit has a like valve mechanism but it does not need the adjustable features described and it is actuated by an oscillatory rod 94 and its handle 95 which are equipped by a spring to cause them to normally assume the horizontal position of the handle and the closed position of the valve.

Those skilled in and acquainted with this art will readily understand that this invention is not necessarily limited and restricted to the precise and exact details of construction and mode of operation illustrated and described and that reasonable modifications may be resorted to without departure from the heart and essence of the invention, as defined by the appended claims, and without the loss or sacrifice of any of its material benefits and advantages.

For example, the cams 38 on the double link-member 37 are not absolutely essential although desirable because the rollers could be employed without the cams to roll on the undersides of such links, but the use of the cams has the advantage that the lifting operation is more uniform.

By controlling the two valves in the two cylinder heads, the raised vehicle instead of being elevated to a level position may be caused to assume a sloping relation.

Although it has been indicated above that the new lifting appliance is adapted for support directly on the floor, it is to be understood that it is not restricted to such employment.

In passing, it should be noted that, in the collapsed or condensed condition of the lifting mechanism, all of the linkages and their actuating means, as well as the base-frame, are in substantially, although not quite exactly, in the same horizontal plane, with some parts inside of the frame and other elements outside of the frame, also that the upper links straddle the corresponding lower links.

I claim:

1. A load lifting-and-lowering apparatus having in combination a base-frame with spaced-apart side-members, a load-support, a pair of transversely registered linkages between and connected to said base and to said load-support, each such linkage including a pair of lower links and a pair of upper links connected therewith, and means to expand or to contract said linkages simultaneously to raise or to lower said load-support, including a lever fulcrumed on said base, and power-means to rock said lever, the novel improvement that said lever is a duplex-lever and fulcrumed near one end of said base, that said lever rocking-means is a combined hydraulic-cylinder, piston and piston-rod hinged on and near the opposite end of said base with its piston-rod hinged to said lever between its two arms, that said lever has rollers thereon, that a corresponding link of each of the two sets of upper links are integral with one another, and that, in the collapsed nested condition of the apparatus said cylinder, piston and piston-rod are accommodated at least in part between the arms of said lever, that said rollers are beneath said two integral links to coact therewith to produce the initial portion of the elevation of said load-support and that all of said links nest at least in part in approximately the same horizontal plane as said base.

2. The novel improvement set forth in claim 1, including the additional novel improvement that, in the collapsed condition of said lifting-and-lowering apparatus, said duplex-lever, its rocking-means and some of said linkages nest within said base-frame, with the remainder of said linkages nesting outside of the side members of said base-frame to form a relatively flat unit.

3. The novel improvement set forth in claim 1, including the additional novel improvement of cams on the underside of said parallel integral links with which cams said rollers coact in a portion of the expansion and contraction of said linkages.

IRA A. WEAVER.

REFERENCES CITED

The following references are of record in the file of this patent:

UNITED STATES PATENTS

| Number | Name | Date |
|---|---|---|
| 636,445 | McCabe et al. | Nov. 7, 1899 |
| 1,079,222 | Dennehy | Nov. 18, 1913 |
| 1,111,409 | Scott | Sept. 22, 1914 |
| 1,138,715 | Young | May 11, 1915 |
| 1,365,252 | Langill | Jan. 11, 1921 |
| 1,806,323 | Weaver et al. | May 19, 1931 |
| 1,825,764 | Weaver et al. | Oct. 6, 1931 |
| 1,903,905 | Carter | Apr. 18, 1933 |
| 1,926,610 | Berglund | Sept. 12, 1933 |
| 1,978,451 | Eason et al. | Oct. 30, 1934 |
| 2,015,357 | Weaver | Sept. 24, 1935 |
| 2,132,343 | Jarrett | Oct. 4, 1938 |
| 2,400,316 | Page | May 14, 1946 |

FOREIGN PATENTS

| Number | Country | Date |
|---|---|---|
| 596,297 | France | Oct. 20, 1925 |